(12) United States Patent
Reighard et al.

(10) Patent No.: US 6,173,864 B1
(45) Date of Patent: Jan. 16, 2001

(54) VISCOUS MATERIAL DISPENSING SYSTEM AND METHOD WITH FEEDBACK CONTROL

(75) Inventors: Michael A. Reighard; John P. Byers, both of Avon Lake; Rick Zakrajsek, Lorain, all of OH (US); Alec J. Babiarz, Encinitas, CA (US); Alan R. Lewis, Carlsbad, CA (US); Floriana Suriawidjaja, San Diego, CA (US)

(73) Assignee: Nordson Corporation, Westlake, OH (US)

( * ) Notice: Under 35 U.S.C. 154(b), the term of this patent shall be extended for 0 days.

(21) Appl. No.: 09/298,325

(22) Filed: Apr. 23, 1999

(51) Int. Cl.[7] ........................................ B67D 5/08

(52) U.S. Cl. .......................... 222/55; 222/61; 222/77

(58) Field of Search ............................. 222/55, 61, 63, 222/77, 420, 504

(56) References Cited

U.S. PATENT DOCUMENTS

| Re. 35,010 | 8/1995 | Price ........................... 222/1 |
|---|---|---|
| 3,994,256 | 11/1976 | Moen ........................... 118/3 |
| 4,271,092 | 6/1981 | Sullivan et al. ............... 261/30 |
| 4,406,247 | 9/1983 | Baughman et al. ........... 118/684 |
| 4,431,690 | 2/1984 | Matt et al. .................... 427/424 |
| 4,470,369 | 9/1984 | Edgerton ...................... 118/723 |
| 4,620,893 | 11/1986 | Parrens ......................... 156/345 |
| 4,666,732 | 5/1987 | Schucker ....................... 427/8 |
| 4,667,852 | 5/1987 | Siemann ........................ 222/54 |
| 4,682,710 | 7/1987 | Turner, Jr. et al. .............. 222/63 |
| 4,682,711 | 7/1987 | Reighard et al. ............... 22/75 |
| 4,787,332 | 11/1988 | Geisel et al. .................. 118/410 |
| 4,891,249 | 1/1990 | McIntyre ...................... 427/421 |
| 4,922,852 | * 5/1990 | Price ............................ 222/55 |
| 4,935,261 | 6/1990 | Srivastava et al. ............ 427/10 |
| 4,987,854 | 1/1991 | Hall .............................. 118/679 |
| 5,042,688 | * 8/1991 | Srivastava .................... 222/55 |
| 5,052,338 | 10/1991 | Maiorca et al. ............... 118/668 |
| 5,175,018 | 12/1992 | Lee et al. ...................... 427/8 |
| 5,208,064 | 5/1993 | Becker et al. ................. 427/8 |
| 5,263,608 | 11/1993 | Kiernan et al. ............... 222/1 |
| 5,271,521 | 12/1993 | Noss et al. .................... 222/1 |
| 5,322,706 | 6/1994 | Merkel et al. ................. 427/8 |
| 5,348,604 | 9/1994 | Neff .............................. 156/272.8 |
| 5,437,727 | 8/1995 | Yoneda et al. ................ 118/669 |

(List continued on next page.)

OTHER PUBLICATIONS

James E. DeVries, *Dispensing and Application Equipment for Adhesives and Sealants*, ASM International, pp. 693–702, 1991, (No Date).

(List continued on next page.)

Primary Examiner—Philippe Derakshani
(74) Attorney, Agent, or Firm—Wood, Herron & Evans, L.L.P.

(57) ABSTRACT

A system for accurately dispensing controlled amounts of viscous material. The system includes a pressurized supply of the viscous material, a dispenser connected with the pressurized supply and a feedback control for ensuring that a discrete dispensed amount corresponds closely to the desired dispensed amount for a particular application. The different methods of feedback control include changing pressure of the pressurized supply after measuring a dispensed amount and comparing the dispensed amount with a stored value representing the desired amount. Another manner of feedback control includes changing an air operating pressure associated with the dispenser. A third type of feedback control includes adjusting the duration that the dispenser is maintained on to dispense the viscous material. Each of these types of feedback control are preferably used in succession, as necessary, to ensure that the desired amount of viscous material is discharged from the dispenser. Methods of controlling an amount of viscous material discharged from a dispenser further include using one or more of the feedback controls described above.

27 Claims, 2 Drawing Sheets

U.S. PATENT DOCUMENTS

Figure 1:
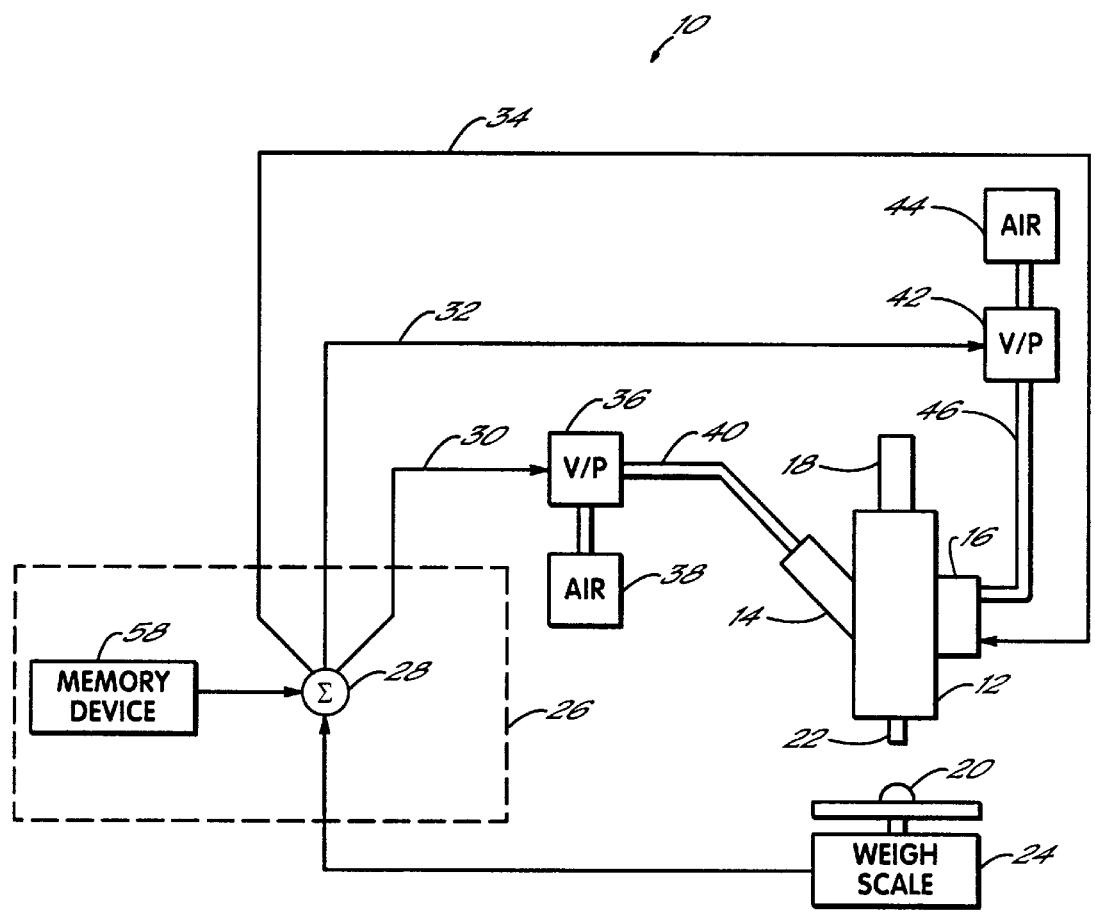

| | | | |
|---|---|---|---|
| 5,510,149 | 4/1996 | Schucker | 427/421 |
| 5,554,224 | 9/1996 | Foltyn | 118/725 |
| 5,558,504 | 9/1996 | Stridsberg | 417/322 |
| 5,747,102 | 5/1998 | Smith et al. | 427/96 |

OTHER PUBLICATIONS

Asymtek, *A–600 Dispensepro™*, Brochure, Aug. 1991 (6 pages), (No Date).

Asymtek, *Three Fully Automated Fluid Dispensing Product Lines*, Press Release, Feb. 1992 (3 pages).

Asymtek, *AV–2000 Automatic Fiducial Locator*, Brochure, undated (1 page), No date.

Asymtek, *A–618C Automated Fluid Dispensing System*, Brochure, undated (4 pages), No date.

Herb Turner, *Automation and Robotics for Adhesives and Sealants Use*, ASM International, pp. 716–725, 1991.

Herb Turner, *Robotic Dispensing of Cold Sealants and Adhesives New Developments*, Nordson Corporation, 1988.

Brochure, Nordson Corporation, *Pro–Flo System*, 1995.

Brochure, Nordson Corporation, *Flo Melt System*, 1984.

Robotics World, *Flexible Automation—Intelligent Machines*, May/Jun. 1989.

*Request for Quotation* dated Nov. 16, 1992 (8 pages).

Ayymtek, *Process Notes for Successful Encapsulation and Underfilling in MCM Assembly*, Nov. 1994 (4 pages).

Asymtek, *The EN–600 Encapsulant System*, Brochure, Mar. 1993 (2 pages).

\* cited by examiner

VISCOUS MATERIAL DISPENSING SYSTEM AND METHOD WITH FEEDBACK CONTROL

FIELD OF THE INVENTION

The present invention generally relates to automated equipment used for dispensing viscous materials. More particularly, the invention relates to systems and methods for dispensing accurate amounts of viscous material, such as during printed circuit (PC) board assembly.

BACKGROUND OF THE INVENTION

In certain fields, such as the field of PC board assembly, small amounts of viscous materials must be applied accurately to a substrate. Such viscous materials have a viscosity greater than about 50 centipoise and include, for example, adhesives, solder flux, solder paste, solder mask, grease, oil, encapsulants, potting compounds, epoxies, dye attach pastes, silicones and RTV.

Manufacturers of PC boards use processes including screening, pin transfer and various other dispensing systems and methods for applying viscous materials to a PC board. Dispensing systems may include either a syringe dispenser or an ON/OFF dispenser valve. Syringe dispensers are used as contact dispensers actuated with pneumatic mechanisms, electro-mechanical mechanisms or positive displacement valves. The tip of a syringe dispenser is placed very close to the substrate, for example, at a distance of 0.005 inches for a very small droplet and a distance of about 0.060 inches for a larger droplet. The viscous material is pushed out of the syringe tip and contacts the substrate while it is still connected to the syringe tip. Syringe style contact dispensers have certain desirable attributes. However, one of the main drawbacks with syringe dispensers relates to their relatively slow operating speed. That is, it is difficult to dispense more than about ten dots of viscous material per second with a syringe dispenser. Stringing of viscous material away from the syringe tip is also a problem that reduces accuracy and quality.

Dispenser valves, which can operate as non-contact ON/OFF dispensers, exhibit certain advantages relative to other dispensing systems and methods. For example, dispenser valves can more quickly dispense a number of minute drops of viscous material on a PC board. This is generally due to elimination of z-axis movement which is necessary with contact dispensers. Also, dispenser valves can reduce or eliminate stringing problems and other problems associated with contact dispensing methods since the dispenser nozzle may be maintained at a greater distance from the substrate. Dispenser valves also allow a greater amount of viscous material to be cleanly and accurately dispensed at a single location by discharging more than one drop at the location.

Despite the various improvements in this field, including those pertaining to contact and non-contact dispensers, additional improvements are necessary to more accurately control the dispensed amount of viscous material. In this regard, variations in the amount of dispensed viscous material can occur due to variations in the characteristics of the viscous material itself or, for example, other machine or dispensing system tolerances. In other words, although the various operating parameters of the dispensing system may be maintained constant, variations may occur in the amount of dispensed material due to other outside factors. For at least these reasons, it would be desirable to provide systems and methods for more accurately controlling the amount of viscous material discharged from a dispenser.

SUMMARY OF INVENTION

In accordance with the present invention, a system is provided which accurately dispenses controlled amounts of viscous material by feeding information on the dispensed amount of viscous material back to one of various control devices which operate a viscous material dispenser. The system can more specifically comprise a pressurized supply of viscous material, a dispenser connected in fluid communication with the pressurized supply and a feedback control operatively connected with the pressurized supply. The feedback control includes a viscous material measuring device operative to measure a dispensed amount of the viscous material. A memory device stores a value representing a control amount of the viscous material. A comparing device compares the dispensed amount with the control amount and produces a correcting output signal which may then be used directly or indirectly to adjust the dispensed amount. While the preferred embodiment of this invention involves the use of at least one non-contact dispenser, various aspects of the invention will also benefit contact dispensing systems.

Three manners are presently contemplated for using the correcting output signal to adjust the dispensed amount of viscous material. First, the output signal may be used by a first transducer to change the pressure of the pressurized supply of viscous material. Second, the output signal may be used by a second transducer to adjust fluid pressure supplied for operating the dispenser. Third, the output signal may be used to change the duration that the dispenser is maintained in an open position to dispense the viscous material. These manners of adjustment may be used individually or in any combination and order of two or more. In the preferred embodiment, each of these manners of adjusting the amount of dispensed viscous material is used in succession within an integrated feedback control system. That is, the feedback control first changes the pressure of the pressurized supply of viscous material within predefined limits. If this change reaches one of the predefined limits and the dispensed amount of material does not adequately match the control amount, then the second manner of adjustment is used to correct the dispensed amount. If this still does not produce the desired amount of dispensed material, then the system reverts to the third manner of adjusting the dispensed amount as described above.

The pressurized supply connected with the dispenser more specifically includes a syringe containing the viscous material and operated by a pressurized fluid which forces viscous material from the syringe into the dispenser. The first transducer may be a voltage to pressure transducer which converts a voltage signal representing the desired correction into a pressure of the pressurized fluid used to operate the syringe. The dispenser may be a known ON/OFF non-contact dispenser valve used for dispensing small amounts of viscous material as drops. The dispenser valve may be operated by a conventional solenoid-operated valve which supplies a fluid pressure, such as air pressure, to the non-contact dispenser valve. The feedback control system may be used to adjust the fluid pressure and/or the ON time of the control valve such that the non-contact dispenser valve dispenses an amount of viscous material which is closer to the control amount than the dispensed amount. The viscous material measuring device may include, for example, a weigh scale or any other suitable measuring device, such as a vision system which measures dot diameter, area or volume.

Various methods of controlling an amount of viscous material discharged from a dispenser may be practiced in accordance with this invention. For example, a method according to the invention may include discharging a first amount of the viscous material from the dispenser, measuring the first amount of viscous material, comparing the first amount to a commanded or desired control amount stored in a memory device, and adjusting the pressure of the pressurized supply to correct for a difference between the first amount and the control amount. Another method which may be used alternatively or in conjunction with the previously described method involves discharging a first amount of the viscous material from a dispenser valve, measuring the first amount of viscous material, comparing the first amount to a commanded control amount stored in a memory device, and adjusting a fluid operating pressure used to actuate the dispenser valve to correct for a difference between the first amount and the commanded control amount. An alternative or additional method which may be practiced in accordance with the invention includes discharging a first amount of the viscous material from an ON/OFF, non-contact dispenser valve, measuring the first amount of viscous material, comparing the first amount to a commanded control amount stored in a memory device, and adjusting the ON time to correct for a difference between the first amount and the control amount.

As generally summarized above, the present invention provides various improvements in the area of dispensing accurate, discrete amounts of viscous material, especially in the field of PC board manufacture. The invention may also apply easily and beneficially to other areas of dispensing technology. Additional features, advantages and configurations of the invention will become more readily apparent to those of ordinary skill in the art upon review of the following detailed description of the preferred embodiment and the appended claims.

DETAILED DESCRIPTION OF DRAWINGS

Figure 2:
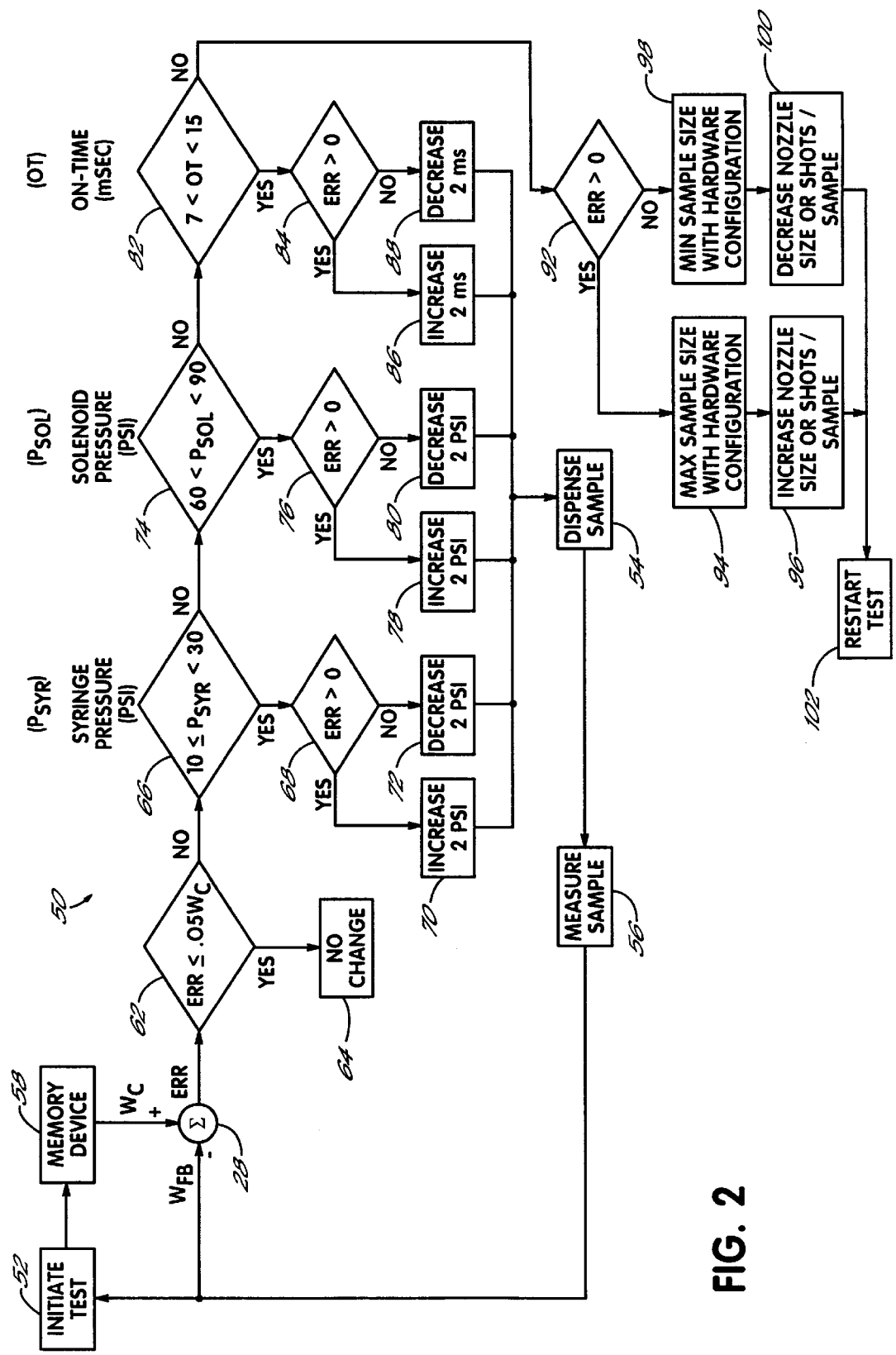

FIG. 1 is a schematically illustrated dispensing system constructed in accordance with the preferred embodiment of the invention; and FIG. 2 is a flow chart illustrating the operation of the system shown in FIG. 1.

DETAILED DESCRIPTION OF PREFERRED EMBODIMENT

Referring first to FIG. 1, a dispensing system 10 configured in accordance with the invention generally includes an ON/OFF dispenser valve 12 which, in this illustrative embodiment, is a non-contact dispenser valve specifically designed for dispensing minute amounts of viscous material. A preferred dispenser valve 12 is more specifically shown and described in U.S. Pat. No. 5,747,102, assigned to the assignee of this invention, and the disclosure of which is hereby incorporated by reference herein. Other contact or non-contact dispensers may also benefit from one or more of the aspects of this invention. Non-contact dispenser 12 further includes a syringe-style supply device 14 for supplying pressurized viscous material to dispenser 12. A control valve 16, which preferably takes the form of a solenoid-operated air valve, may be directly connected to dispenser 12. In a known manner, control valve 16 supplies pressurized air into dispenser 12 to force an internal valve stem (not shown) into an open position. A conventional spring return mechanism 18 may be provided for moving the valve stem into a closed position when the pressurized air from control valve 16 is sufficiently reduced or turned off. Further structural details and operation of dispenser 12 may be understood by referring to the above-incorporated patent.

Non-contact dispenser 12 operates to dispense a specific amount of viscous material 20 from a nozzle 22 as schematically shown in exaggerated form in FIG. 1. A sample 20 or specific amount of viscous material may be formed by one or more dispensed drops. As will be described further below, a measuring device 24, in the preferred form of a weigh scale, is used in a feedback control system to accurately control the amount of dispensed viscous material. Other types of feedback devices may be substituted for weigh scale 24 and, for example, may include other drop size measurement devices such as vision systems, including cameras, L.E.D.'s or phototransistors for measuring the diameter, area and/or volume of the dispensed material. Weigh scale 24 is operatively connected to a controller 26 which includes a comparing device 28. Comparing device 28 may be a comparison circuit which compares a signal representing a measured amount of viscous material, i.e., sample 20, with a signal representing a control amount stored within controller 26. The control amount represents the desired amount for a particular application. The controller may be a programmable logic controller (PLC) or other microprocessor based controller, such as a computer, or other conventional control devices capable of carrying out the functions described herein as will be understood by those of ordinary skill.

Based on the comparison performed by controller 26, one or more correction values or correcting signals 30, 32, 34 are output to adjust the amount of dispensed material. For example, output signal 30 may be directed to a voltage-to-pressure transducer 36 which converts the voltage to an air pressure such that a corrected air pressure is sent from an air supply 38 to an air line 40 connected with syringe 14. Alternatively, or in conjunction with this corrective action, output signal 32 may be sent to a second voltage-to-pressure transducer 42 which controls air pressure to solenoid-operated air valve 16. Specifically, voltage-to-pressure transducer 42 converts the output signal 32 into an air pressure such that a corrected air pressure is sent from an air supply 44 into an air line 46 connected with solenoid-operated air valve 16 and, ultimately, with dispenser valve 12. In each of these instances, when pressure increases in air lines 40 or 46, the dispensed amount of viscous material will likewise increase and, when the air pressure is decreased, the dispensed amount will likewise decrease. The third manner of adjusting the amount of dispensed viscous material involves adjusting the ON time of solenoid-operated air valve 16. As the ON time increases, the amount of dispensed material also increases and vice versa. The ON time is controlled by changing the duration of output signal 34 sent to activate or open solenoid-operated air valve 16. Thus, the duration of output signal 34 may be determined by controller 26 after comparing the dispensed amount of material measured by weigh scale 24 with a desired amount or control amount stored in controller 26.

The operation of dispensing system 10 to calibrate the amount of dispensed viscous material will be best understood with reference to FIG. 51 as well as the flow chart 50 shown in FIG. 2. Flow chart 50 represents the process steps carried out by controller 26 used to dispense a controlled amount of viscous material, such as a sample drop 20. The process steps may be carried out with conventional processing hardware, as mentioned above, and as will be readily appreciated by those of ordinary skill. The calibration process is initiated at step 52 and, in conjunction with this test initiation, a sample 20 of viscous material, such as in the form of one or more drops, is dispensed from dispenser valve 12. The amount or size of sample 20 is measured at step 56 by being weighed on weigh scale 24. A weight value $W_{fb}$ is sent to comparing device 28 of controller 26 and comparing device 28 subtracts this value from a commanded weight value $W_c$ retrieved from a memory device 58 of controller 26. The resulting value represents an error value ERR. At step 62, this error value ERR is checked for acceptability. That is, if the error is less than or equal to 5% of the desired weight $W_c$, then no changes are necessary in calibration. This condition, as represented at step 64, may be indicated to an operator by signaling the operator with a light or other indicator. Of course, different applications may have different acceptable error values.

If the error ERR is greater than 5% of the desired weight $W_c$, then at process step 66, the controller 26 determines whether the pressure within syringe 14 falls within the operating range of 10 psi to 30 psi. That is, if the pressure within syringe 14 is within an appropriate operating range, then corrective action by varying the pressure supplied to syringe 14 is possible. If this is the case, at step 68, the controller determines whether the error ERR is greater than zero or positive, meaning that the desired size or weight of sample 20 is greater than the feedback weight or weight of the sample 20. In this case, the pressure fed to syringe 14 may be incrementally increased, for example, by 2 psi. If the error is not greater than zero, i.e., if the error is negative, then the weight of sample 20 or $W_{fb}$ is greater than the desired size or weight and the pressure to syringe 14 is decreased by 2 psi at step 72. As an alternative to a specific, incremental pressure increase or decrease, the pressure may be changed in a more proportional and accurate manner relative to the error. At this point, a sample is again dispensed onto weigh scale 24 and the process is repeated with measurement at step 56 and a comparison being made by comparing device 28 to determine the error ERR. If the error is less than or equal to 5% of the desired size or weight $W_c$, then no changes or corrections are necessary as indicated at step 64. If additional correction is necessary, the process is repeated as described above with respect to step 66 until the pressure within syringe 14 falls outside of the 10–30 psi operating range. At this point, if correction is still necessary, the process continues to step 74.

More specifically, at step 74, controller 26 determines whether the pressure of solenoid valve 16 is within a proper operating range. In this embodiment, this range is between 60 psi and 90 psi. If the operating pressure is within this range, then at step 76 controller 26 determines whether the error ERR is positive or negative. If positive, meaning that the weight of sample 20 is less than the desired weight $W_c$, the pressure to solenoid valve 16 is increased by 2 psi. If the error is negative, meaning that the weight of sample 20 is greater than the desired weight $W_c$, then the pressure to solenoid valve 16 is decreased by 2 psi. Again, the amount of these corrective pressure changes may instead be determined and made in proportion to the amount of the error ERR. After either step 78 or 80 is performed, another sample is dispensed at step 54 and the process is repeated to determine whether the error is within an acceptable amount. If the error is still unacceptable, then the process is repeated until the pressure within solenoid 16 is outside of the 60–90 psi operating range, then the process will continue to step 82 and use solenoid ON time as an additional method of correction.

Solenoid ON time will also have an operating range, for example, which may be between 7 milliseconds and 15 milliseconds as indicated at step 82. As long as the ON time stored within controller 26 is within this range, adjustments may be made to the duration that solenoid-operated air valve 16 is maintained ON to change the amount of dispensed material. Thus, at step 84, if the error is positive, the ON time will be increased by 2 milliseconds at step 86 and, if the error is negative, the ON time will be decreased by 2 milliseconds as indicated at step 88. Like the incremental pressure changes described above, these changes in ON time may instead be determined and made in proportion to the detected error.

After performing either step 86 or step 88, a sample will again be dispensed and measured and the process will be repeated to determine whether the dispensed sample is within an acceptable weight range. If it is not, the correction process continues until the ON time adjustments can no longer be made, i.e., until the ON time falls outside of the 7–15 millisecond range.

In this case, as indicated at step 92, controller 26 determines whether the error that remains is positive or negative. If the error is positive, the system will indicate that the maximum size has been reached with the particular hardware configuration. As indicated at step 96, the hardware may be appropriately changed, such as by increasing the nozzle size, or dispenser valve 12 may increase the number of drops used to form sample 20. If the error is negative, controller 26 indicates that the minimum size has been reached with the hardware configuration. As indicated at step 100, the nozzle size may be decreased or a decrease in the number of drops may be used to appropriately decrease the size of sample 20. Once these changes have been made, the test may be restarted as indicated at step 102.

While the present invention has been illustrated by a description of the preferred embodiment and while this embodiment has been described in some detail, it is not the intention of the Applicants to restrict or in any way limit the scope of the appended claims to such detail.

Additional advantages and modifications will readily appear to those skilled in the art. As some examples, various hardware and software configurations may be used to carry out the inventive concepts expressed herein. The correcting output signals may not be signals directly to the transducers or to the control valve, but may be conditioned in some manner recognizable by the transducer or control valve to make the appropriate correction. Also, the transducer devices and other control devices are not necessarily single devices or units but may be multiple sensing and control components which, together, are capable of carrying out the functions expressed herein. This has been a description of the present invention, along with the preferred methods of practicing the present invention as currently known. However, the invention itself should only be defined by the appended claims, wherein,

We claim:

1. A system for accurately dispensing controlled amounts of viscous material, the system comprising:

a pressurized supply of said viscous material;

a dispenser connected in fluid communication with said pressurized supply;

a feedback control operatively connected with said pressurized supply, said feedback control including:

a viscous material measuring device operative to measure a dispensed amount of said viscous material, a memory device operative to store a value representing a control amount of said viscous material, a comparing device operative to compare the dispensed amount with the control amount and produce a correcting output signal, and a transducer device operatively coupled with the comparing device to receive the correcting output signal and change the pressure of said pressurized supply such that said dispenser dispenses an amount of viscous material which is closer to said control amount than said dispensed amount.

2. The system of claim 1, wherein said pressurized supply further comprises a syringe filled with said viscous material.

3. The system of claim 2 further comprising a pressurized fluid source connected with said syringe and operable to force said viscous material from said syringe into said dispenser under pressure, and wherein said transducer changes the pressure of said pressurized fluid source in response to said correcting output signal.

4. The system of claim 1 further comprising a control valve, and wherein said dispenser further comprises an ON/OFF dispenser valve operated between open and closed positions by said control valve.

5. The system of claim 4, wherein said feedback control supplies a fluid pressure to said control valve and uses said correcting output signal to change said fluid pressure such that said ON/OFF dispenser valve dispenses an amount of viscous material which is closer to said control amount than said dispensed amount.

6. The system of claim 5, wherein said control valve includes first and second conditions corresponding respectively to the open and closed positions of said ON/OFF dispenser valve, said feedback control operating said control valve such that said feedback control changes a duration of said first condition in accordance with said correcting output signal so that said ON/OFF dispenser valve dispenses an amount of viscous material which is closer to said control amount than said dispensed amount.

7. The system of claim 4, wherein said control valve includes first and second conditions corresponding respectively to the open and closed positions of said ON/OFF dispenser valve, said feedback control operating said control valve such that said feedback control changes a duration of said first condition in accordance with said correcting output signal so that said dispenser valve dispenses an amount of viscous material which is closer to said control amount than said dispensed amount.

8. The system of claim 1, wherein said viscous material measuring device further comprises a weigh scale.

9. The system of claim 1, wherein said correcting output signal is a voltage and the transducer device further includes a voltage to pressure transducer.

10. A system for accurately dispensing controlled amounts of viscous material, the system comprising:
 a pressurized supply of said viscous material;
 a dispenser connected in fluid communication with said pressurized supply;
 a control valve operative to supply fluid pressure to said dispenser to change said dispenser between open and closed positions;
 a feedback control operatively connected with said control valve, said feedback control including:
 a viscous material measuring device operative to measure a dispensed amount of said viscous material,
 a memory device operative to store a value representing a control amount of said viscous material,
 a comparing device operative to compare the dispensed amount with the control amount and produce a correcting output signal, and
 a transducer operatively coupled with the comparing device to receive the correcting output signal and change said fluid pressure such that said dispenser dispenses an amount of viscous material which is closer to said control amount than said dispensed amount.

11. The system of claim 10, wherein said control valve includes first and second conditions corresponding respectively to the open and closed positions of said dispenser, said feedback control operating said control valve such that said feedback control changes a duration of said first condition in accordance with said correcting output signal so that said dispenser dispenses an amount of viscous material which is closer to said control amount than said dispensed amount.

12. The system of claim 10, wherein said dispenser further comprises an ON/OFF dispensing valve having a valve stem operated between said open and closed positions by said fluid pressure.

13. A system for accurately dispensing controlled amounts of viscous material, the system comprising:
 a pressurized supply of said viscous material;
 a dispenser connected in fluid communication with said pressurized supply;
 a control valve operatively connected with said dispenser and having first and second conditions that respectively change said dispenser between open and closed positions;
 a feedback control operatively connected with said control valve, said feedback control including:
 a viscous material measuring device operative to measure a dispensed amount of said viscous material,
 a memory device operative to store a value representing a control amount of said viscous material, and
 a comparing device operative to compare the dispensed amount with the control amount and produce a correcting output signal, said correcting output signal being used to change the duration of said first condition such that said dispenser dispenses an amount of viscous material which is closer to said control amount than said dispensed amount.

14. The system of claim 13, wherein said dispenser further comprises an ON/OFF dispensing valve having a valve stem operated between said open and closed positions by a said fluid pressure supplied by said control valve.

15. A method of controlling an amount of viscous material discharged from a dispenser connected with a pressurized supply of said viscous material, the method comprising:
 discharging a first amount of said viscous material from said dispenser;
 measuring said first amount of viscous material;
 comparing said first amount to a control amount stored in a memory device; and
 adjusting the pressure of said pressurized supply to correct for a difference between said first amount and said control amount.

16. The method claim 15, wherein the pressure of said pressurized supply operates within a pressure range and said dispenser is an ON/OFF dispenser valve which is selectively opened by fluid pressure to dispense said viscous material, and the method further comprises:
 adjusting said fluid pressure to correct for a difference between said first amount and said control amount when said pressurized supply reaches an outer limit of said pressure range.

17. The method of claim 16, wherein the fluid pressure used to open said ON/OFF dispenser valve is supplied within a pressure range and said ON/OFF dispenser valve is controlled to maintain an open position for a period of ON time to dispense said viscous material, and the method further comprises:

adjusting said ON time to correct for a difference between said first amount and said control amount when the fluid pressure used to open said ON/OFF dispenser valve reaches an outer limit of its pressure range.

18. The method of claim 15, wherein said pressurized supply further comprises a syringe device operated by a fluid pressure to discharge said viscous material into said dispenser, and the method further comprises:

adjusting the fluid pressure to thereby adjust the pressure of said viscous material in said syringe device and correct for the difference between said first amount and said control amount.

19. The method of claim 15, wherein the pressure of said pressurized supply operates within a pressure range and said dispenser is an ON/OFF dispenser valve which is controlled to maintain an open position for a period of ON time to dispense said viscous material, and the method further comprises:

adjusting said ON time to correct for a difference between said first amount and said control amount when the pressure of said pressurized supply reaches an outer limit of its pressure range.

20. The method of claim 15, wherein said dispenser is an ON/OFF dispenser valve which is selectively opened by fluid pressure to dispense said viscous material, and the method further comprises:

adjusting said fluid pressure to correct for a difference between said first amount and said control amount.

21. The method of claim 20, wherein said ON/OFF dispenser valve is controlled to maintain an open position for a period of ON time to dispense said viscous material, and the method further comprises:

adjusting said ON time to correct for a difference between said first amount and said control amount.

22. The method of claim 15, wherein said dispenser is an ON/OFF dispenser valve which is controlled to maintain an open position for a period of ON time to dispense said viscous material, and the method further comprises:

adjusting said ON time to correct for a difference between said first amount and said control amount.

23. A method of controlling an amount of viscous material discharged from an ON/OFF dispenser valve connected with a pressurized supply of said viscous material, wherein said dispenser valve is selectively opened by fluid pressure to dispense said viscous material, the method comprising:

discharging a first amount of said viscous material from said ON/OFF dispenser valve;

measuring said first amount of viscous material;

comparing said first amount to a control amount stored in a memory device; and adjusting the fluid pressure to correct for a difference between said first amount and said control amount.

24. The method of claim 23, wherein the fluid pressure used to open said ON/OFF dispenser valve is supplied within a pressure range and said ON/OFF dispenser valve is controlled to maintain an open position for a period of ON time to dispense said viscous material, and the method further comprises:

adjusting said ON time to correct for a difference between said first amount and said control amount when the fluid pressure used to open said ON/OFF dispenser valve reaches an outer limit of its pressure range.

25. The method of claim 23, wherein said ON/OFF dispenser valve is controlled to maintain an open position for a period of ON time to dispense said viscous material, and the method further comprises:

adjusting said ON time to correct for a difference between said first amount and said control amount.

26. A method of controlling an amount of viscous material discharged from an ON/OFF non-contact dispenser valve which is controlled to maintain an open position for a period of ON time to dispense said viscous material, the method comprising:

discharging a first amount of said viscous material from said ON/OFF non-contact dispenser valve;

measuring said first amount of viscous material;

comparing said first amount to a control amount stored in a memory device; and adjusting the ON time to correct for a difference between said first amount and said control amount.

27. The method of claim 26, wherein said dispenser valve is operated by fluid pressure and a control valve supplies said fluid pressure to maintain said dispenser valve open for said period of ON time, and the method further comprising:

adjusting the ON time by adjusting the length of time that said control valve supplies said fluid pressure to said dispenser valve.

* * * * *